UNITED STATES PATENT OFFICE.

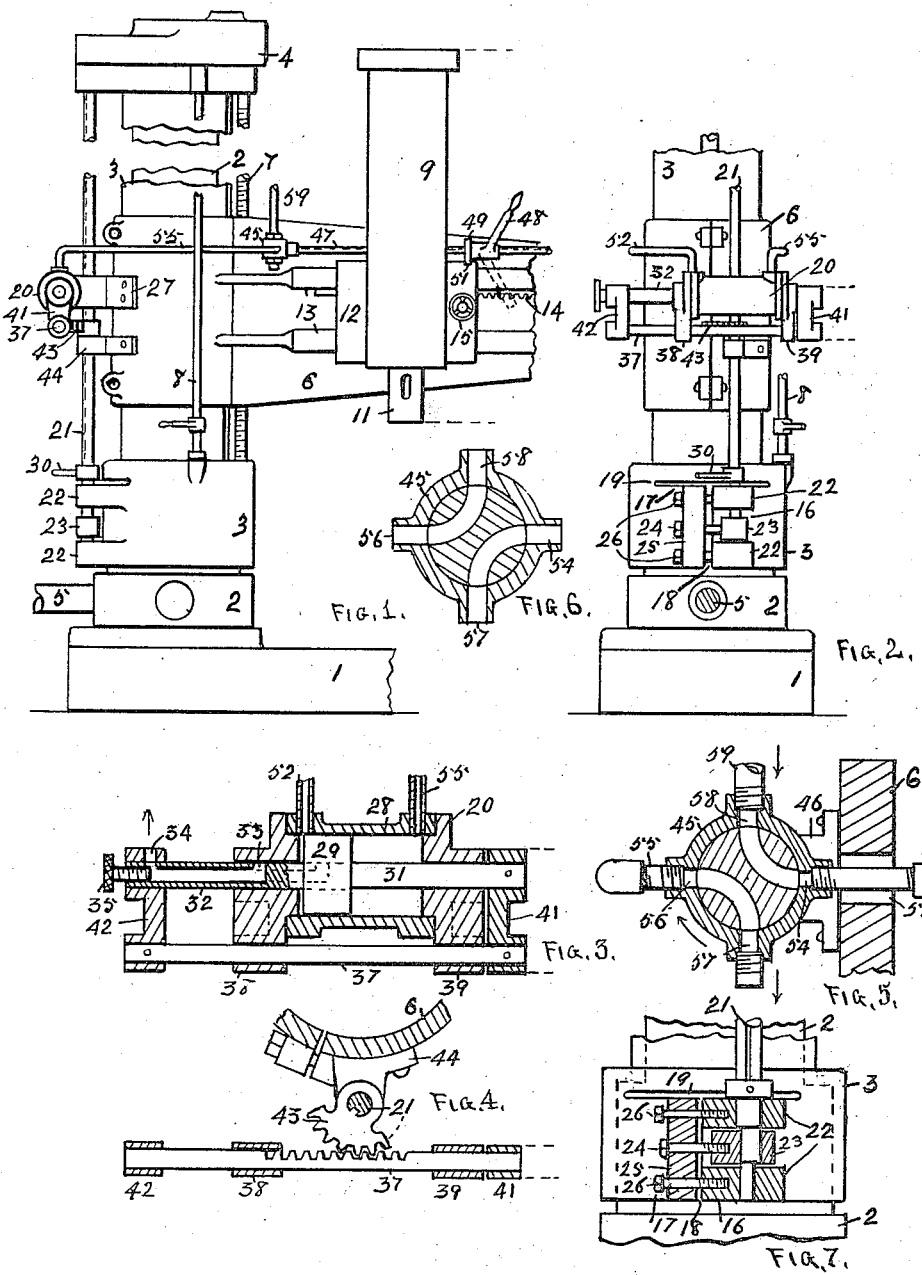

DAVID C. KLAUSMEYER, OF OAKLEY, OHIO, ASSIGNOR TO THE CINCINNATI-BICKFORD TOOL COMPANY, OF CINCINNATI, OHIO, A CORPORATION OF OHIO.

CLAMPING MECHANISM.

1,070,815.   Specification of Letters Patent.   Patented Aug. 19, 1913.

Application filed September 30, 1912.  Serial No. 723,098.

*To all whom it may concern:*

Be it known that I, DAVID C. KLAUSMEYER, a citizen of the United States, residing at Oakley, Ohio, have invented a new and useful Improvement in Clamping Mechanisms, of which the following is a specification.

My invention relates to clamping mechanisms of the class adapted to the use of machine tools or for other suitable purposes, and the objects of my improvements are to provide power actuated mechanism for securely clamping a sleeve in different rotative positions upon a concentric cylinder; to provide extensible operating connections with said mechanism for convenience of access to the operator in different positions; to include within said mechanism a fluid pressure motor of novel construction, and to provide simple and durable construction and assemblage of the various parts for securing facility of operation together with accuracy and efficiency of action. These objects may be attained in the following described manner as illustrated in the accompanying drawings, in which:

Figure 1 represents a side elevation of portions of a radial drill provided with my improvements; Fig. 2 a rear elevation; Fig. 3 a longitudinal section of the motor; Fig. 4 a plan of the rack and segmental pinion with connecting members in section; Figs. 5 and 6, transverse sections of the four way cock, in different positions, and Fig. 7 a detail with parts in section of the clamping portion of the sleeve.

In the drawings 1 represents the base of a radial drill; 2 the cylindrical column; 3 the sleeve rotatively adjustable thereon; 4 the gear box mounted on the sleeve; 5 the driving shaft having connections through the column therewith; 6 the radial arm vertically adjustable on the sleeve by means of the screw 7; 8 the shifting rod for engaging or disengaging said screw with the driven gears within the gear box 4; 9 the gear box for the drill spindle 11; said box being supported on the radial arm by means of the saddle 12 which is movable on the arm guides 13 by means of a pinion engaging with the rack 14 and actuated by the hand wheel 15, all being constructed and arranged in the ordinary manner.

The sleeve 3 is formed with wings 16 and 17 in its lower portion by means of the vertical and transverse slits 18 and 19 through its rear wall. An eccentric shaft 21 journaled in bearings 22 formed on the wing 16 is provided with the eccentric collar 23. The clamping screw 24 inserted through the projecting boss 25 formed on the wing 17 is adjustably secured to the collar 23. Screws 26 inserted through the boss 25 and adjustably engaging with the respective bearings 22 serve to limit the spread of the wings apart. For thin sleeves on small drills adapted only to perform light duty a hand lever 30 may be sufficient to turn the eccentric shaft with the eccentric collar 23 on the center as shown in Fig. 2, which causes the clamping screw 24 when properly adjusted to move and maintain the wings immovably clamped on the contiguous surface of the column. On drills or tools of large size, however, which are intended for heavy duty, it is desirable to utilize power for contracting the heavy wings into immovable clamping engagement with the column.

The motor 20 adapted to the use of air or other elastic fluid under pressure, may be secured on the collar of the radial arm by means of the bracket 27. Said motor consists of the cylinder 28 wherein the piston 29 provided with oppositely disposed piston rods 31 and 32 may be reciprocated. The rod 31 is formed hollow with the auxiliary discharge ports 33 and 34 leading therefrom, and is provided with an adjusting screw 35 for controlling the discharge from port 34. A rack 37 slidably mounted in the bearings 38 and 39 which depend from the respective ends of the motor is secured at its ends to the respective piston rods 31 and 32 by means of the brackets 41 and 42 and is movable therewith. A segmental gear 43 journaled in a bearing 44 secured to the collar of the radial arm is splined on the eccentric shaft 21 and engages with said rack. A four way cock 45 secured on the radial arm by means of the bracket 46 is provided with the stem 47 which is extended the length of said arm. The hand lever 48 splined on said stem is formed with the annular flange 49 which engages with a notch 51 formed in the saddle 12 whereby said lever is movable with the saddle to different longitudinal positions on the stem and maintained in the same position in relation to the spindle 11. The pipe 52 leading from the rear end of the cylinder is extended through an opening 53 formed in the radial arm and communicates with the port 54 of the four way cock 45 and the pipe 55 leading from the front end of the cylinder communicates through the port 56 with said cock. 57 represents the discharge port and 58 the inlet port of cock 45 which communicates through the pipe 59 with a source (not shown) of fluid under pressure.

In operation, when the four way cock is turned by means of the hand lever 48 into the position shown in Fig. 6 the compressed air is admitted from the pipe 59 through the ports 58 and 56 of the cock 45 and through the pipe 55 to the motor for driving the piston toward the the rear end thereof, as shown in Fig. 3. The rack being actuated with the piston serves to turn the segmental gear and the eccentric shaft 21 with the collar 23 on its center as shown in Fig. 7 whereby the screw 24 is caused to contract the wings 16 and 17 and thereby securely clamp the sleeve on the column in predetermined positions of rotative adjustment thereon.

The movement of the hand lever 48 in the reverse direction serves to open the discharge from the motor through the pipe 55 and the ports 56 and 57 of the cock 45 and to admit the fluid to the rear end of the cylinder 28 through the ports 58 and 54 and the pipe 52, as shown in Fig. 5. The fluid thus admitted serves to move the piston with the rack in a forward direction for actuating the segmental gear and the eccentric shaft a partial turn whereby the eccentric collar 23 and the clamping screw 24 release the wings and permit them to separate to the limit permitted by the screws 26 and thus release the sleeve from the column. After the piston is thus moved a predetermined distance in a forward direction to bring the auxiliary port 33 with the cylinder, as shown by dotted lines in Fig. 3, the fluid is permitted to escape therethrough and through the hollow piston rod 32 and port 34 for lessening the force of contact of the piston with the front end of the cylinder. The adjusting screw 35 serves to control the size of the port 34 to correspond with the fluid under different pressures. After the piston has been actuated in either direction, the hand lever may be moved to an intermediate position for closing the four way cock and preventing the compressed fluid from escaping.

Having fully described my improvement, what I claim as my invention and desire to secure by Letters Patent of the United States is:

1. The combination of a cylinder, a sleeve formed with a split end portion and rotatively adjustable thereon, an eccentric shaft journaled on one side of the split portion, an eccentric collar thereon, adjustable connections from said collar with the other side of the split portion of the sleeve, a power actuated motor, and rack and pinion connections of the shaft therewith.

2. In a radial drill the combination of a cylindrical column, a sleeve rotatively adjustable thereon, a radial arm vertically adjustable on the sleeve, clamping connections of the sleeve with the column, a fluid driven motor secured to the arm, actuating connections therefrom with the clamping connections, a cock secured to the arm for controlling the fluid to and from the motor and provided with an extended stem parallel with the arm, and a hand lever splined on the stem.

3. In a radial drill, a column, a sleeve thereon, a radial arm on the sleeve, a spindle adjustable on the arm, a four way cock provided with a stem extended parallel with the arm, a lever splined on the stem, means for moving and maintaining the lever in constant distance relations with the spindle, a motor, fluid connections from the cock therewith, and clamping connections actuated by the motor between the sleeve and column.

4. In a radial drill, a column, a sleeve thereon, clamping connections between the sleeve and column, a radial arm adjustable on the sleeve, a saddle adjustable on the arm, a cock secured on the arm and provided with an extended stem, a lever splined on the stem and movable with the saddle along the arm and stem, a motor, fluid connections thereto controlled by the cock, and connections therefrom for actuating the clamping connections.

5. In a radial drill, the combination of a column, a sleeve thereon, an eccentric shaft on the sleeve, clamping connections of the sleeve with the shaft actuated thereby, an arm adjustable on the sleeve, a gear journaled thereon and splined on the shaft, a motor driven rack engaging with the gear, a drill spindle adjustable longitudinally on the arm, a cock secured on the arm for controlling the motor, and connections adjustable on the arm with the spindle for actuating the cock.

6. In a radial drill, the combination of a support, a radial arm adjustable thereon, a spindle adjustable on the arm, a cock provided with a stem extended along the arm, a lever splined on the stem and adjustable on the arm with the spindle, a motor, fluid connections from the cock therewith, and mechanism actuated by the motor for maintaining the arm in different positions of adjustment on the support.

7. In a radial drill, the combination with a vertical support, an arm radially adjustable thereon, a saddle adjustably secured on the arm, of a motor, mechanism actuated thereby for maintaining the arm in different positions of adjustment on the support, a lever movable with the saddle and connections therewith for controlling the flow of the fluid to and from the motor.

DAVID C. KLAUSMEYER.

Witnesses:
S. C. Schaner,
Aug. H. Tuechter.